Figure 1:
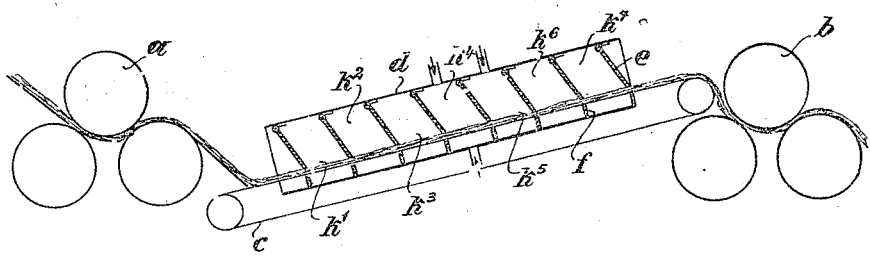

O. MENGELBIER.
EXTRACTION OF JUICE FROM SUGAR CANE AND SIMILAR SACCHARINE MATERIAL.
APPLICATION FILED SEPT. 6, 1913.

1,141,572.  Patented June 1, 1915.

UNITED STATES PATENT OFFICE.

OSCAR MENGELBIER, OF BERLIN, GERMANY.

EXTRACTION OF JUICE FROM SUGAR-CANE AND SIMILAR SACCHARINE MATERIAL.

1,141,572.     Specification of Letters Patent.     Patented June 1, 1915.

Application filed September 6, 1913. Serial No. 788,451.

*To all whom it may concern:*

Be it known that I, OSCAR MENGELBIER, a subject of the King of Prussia, and resident of Berlin, German Empire, have invented certain new and useful Improvements Relating to the Extraction of Juice from Sugar-Cane and Similar Saccharine Material, of which the following is a specification.

This invention relates to the extraction of juice from sugar cane and similar saccharine material. It is known to extract the juice from sugar cane by passing it through a mill and then transferring the bagasse delivered therefrom to a conveyer band adapted to carry it through a chamber in which it is kneaded by a series of rollers and simultaneously treated with steam or hot water or both for the purpose of softening the fiber to such an extent that it is in a condition suited to a more complete extraction of juice before it enters a second mill. By such procedure, however, it is not possible to open up the bagasse to such an extent that not only the juice contained in the stems between the nodes, but also that contained in the nodes, is extracted. Hitherto, therefore, it has been necessary to remove the nodes from the bagasse on the conveyer band before the bagasse entered the second mill, the result being that the juice contained in the nodes was lost. Consequently the object aimed at, namely the complete extraction of the juice contained in canes as a whole, was not realized.

According to the present invention the bagasse is treated, advantageously after the second preliminary pressing operation, first with sufficient steam under pressure to heat the bagasse to a high temperature, and then with a highly heated liquid in such quantity that this liquid, in conjunction with the water resulting from condensation of the aforesaid steam, provides the amount of liquid necessary for diluting the juice. This treatment is carried out in a chamber that admits of a certain excess pressure being attained, in order that the bagasse may be heated by the steam to a high temperature. The pre-heating of the liquid may be effected in the same or in some other chamber. The supply of steam is conveniently obtained from the exhaust of the steam engine used in driving the plant. The steam, admitted at a temperature of about 110° C., gives up the whole of its latent heat to the bagasse and thereby heats the latter to such a degree that the cells of the bark and the nodes are opened up with certainty and thus rendered accessible to the subsequently applied liquid; the temperature to which the bagasse is raised by steam should exceed, if possible, the temperature of the subsequently applied liquid. The hotter this diluting liquid remains during its action on the bagasse, the more completely will the sugar contained in the latter be dissolved out, and the more certainly will the cells of the hard nodes be utilized, instead of being wasted as hitherto. The treatment with steam and with liquid successively may be carried out in a single chamber by first introducing the steam, and then, after a suitable interval of time, the liquid, or the treatment may be successive not only in point of time but also spacially, by conducting the bagasse continuously from one to the other of two or more compartments in series, the first or foremost being supplied with steam and the second or rearmost with liquid.

The advantage secured by the present invention as compared with the method hitherto adopted resides in great economy of time and power, and hence of expenditure, being effected. If it were attempted to obtain the necessary amount of diluting liquid, (the weight of which is approximately equal to that of the bagasse, exclusively by the condensation of waste steam, the steam available would be insufficient, and it would be necessary to have recourse to the costly expedient of using fresh steam to make up the deficiency. Moreover, the time required to effect the condensation of so large a volume of steam would be so long that the output of the plant would be reduced. If on the other hand it were attempted to obtain the heat necessary for thoroughly opening up the cells of the bagasse exclusively from the highly heated diluting liquid, the operation would have to be carried out to such an extent that the cost of subsequently evaporating so large a bulk of liquid would be excessively high. If, again, steam and water are used simultaneously, the temperature (namely 100° C. and more) necessary for the proper opening up of the cells in the bark and the hard nodes is not attained. As distinct from either of such methods of procedure, the quantity of steam used in accordance with the present invention is only such as is necessary to raise the temperature of the bagasse to that requisite for opening it up, after its one or more preliminary treatments, with hot liquid while being pressed one or more times; the quantity of water of condensation resulting from such steam treatment is only a small percentage of that required for diluting the juice, and the deficiency is made up by subsequently adding highly heated liquid.

In order that the invention may be clearly understood and readily carried into effect the same will now be described more fully with reference to two methods of procedure, one method involving what may be termed intermittent operation, and the other, continuous operation. In each case the sugar cane (preferably in a disintegrated condition) is first pressed; if the pressing or juice-extracting operation is repeated, the extruded juice is diluted between every two successive pressing operations. In order to obtain the juice from the cells not opened up by the foregoing operation the procedure that forms the subject of the present invention is then resorted to.

In the case of intermittent operation, the bagasse is placed in a vessel which is hermetically sealed, and steam (exhaust steam for example) is then introduced and allowed to act upon the bagasse. The highly heated diluting liquid, such as the lye or washing water of the factory, is then added. This liquid, in conjunction with the water of condensation of the steam, effects the necessary dilution of the juice. A fresh extrusion of the juice is then performed.

In the case of continuous operation, the bagasse is conducted, on its way between two groups of pressing rollers, through first one and then the other of two compartments of a chamber in which a certain excess pressure can be maintained. In the first compartment the bagasse undergoes steam treatment and in the second compartment the juice is diluted. It is advantageous to provide one or more compartments in front of and at the rear of these two compartments because it is not practicable to seal the two main compartments completely; in the additional compartments any escaping steam is condensed, and in the case of the foremost compartments the bagasse undergoes a preliminary heating.

In the accompanying drawings two constructional forms of multiple-compartment chambers of the kind above described are illustrated.

Figure 2:
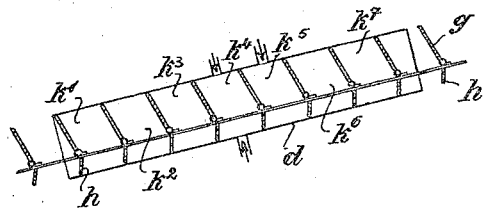

Figure 1 shows in longitudinal section one of these embodiments for carrying out this method, and Fig. 2, a similar view of a second embodiment.

Referring first to Fig. 1, $a$ and $b$ are two groups of pressing rollers and $c$ is a conveyer band which conducts the bagasse from one group of rollers to the other group. The upper length of the band $c$ passes through the channel shaped chamber $d$. This chamber is divided into compartments by flap doors $e$ and partitions $f$ carried by the chamber walls; the approximate steam tight condition of these compartments may be improved if strips of rubber or the like are used on the doors and partitions. The band $c$ on which the bagasse is carried travels between the opposing edges of the doors and partitions. The construction in Fig. 2 differs from that of Fig. 1 in that the doors $g$ and partitions $h$ are carried by the band instead of by the chamber $d$, and pass in as close proximity as possible to the walls of the chamber. The bagasse falls continuously from the first group of rollers into the compartments constituted by the doors and is carried in them through the chamber $d$.

In either construction the doors are arranged at such intervals from one another relatively to the length of the chamber that the latter is divided into a series of approximately steamtight compartments, seven such compartments $k'$ to $k^7$ being shown in the drawings. The steam employed enters the chamber at the compartment $k^4$, and after penetrating and heating the bagasse, partially condenses and partially escapes into the compartments $k^5$ to $k^7$ and $k^3$ to $k'$. In the compartments $k^3$ to $k'$ the steam makes contact with colder bagasse which it preliminarily heats and on which it condenses. The steam reaching the heated bagasse in the compartments $k^5$ to $k^7$ is condensed by the diluting liquid that is introduced into one of them, the compartment $k^5$ for example. The diluting liquid, which is preferably preheated to a high temperature, together with the water of condensation of the steam, dilute the juice, as already stated. From the rear end of the chamber $d$ the bagasse is delivered to the second group of rollers.

It will of course be understood that in the case of continuous operation the chamber intended for the steam treatment and the compartments of this chamber can be formed in a different manner from that shown.

An essential feature in connection with continuous working is that two or more compartments, as steamtight as possible, should be provided, the bagasse passing continuously through or with these chambers, and undergoing treatment with steam and with highly heated diluting liquid in succession.

In the case of successive treatment with steam and with diluting liquid in successive compartments as above described it is necessary to make the conveyer mechanism of a certain length. Accordingly when it is desired to incorporate apparatus of this kind for carrying the novel process into practice with an existing sugar cane rolling mill, in which the interval between the several pressing mechanisms is not sufficient for the interposition of this apparatus, the difficulty can be overcome by giving the conveyer mechanism a steeper inclination and conducting the bagasse into the roller mechanism by means of a rake.

The conveyer mechanism can also be subdivided, the bagasse being first of all carried upward at a sharp angle and then downward through a steam chamber, the dilution of the juice being effected beneath the steam chamber and the bagasse being finally conducted to the next roller mechanism on a short conveyer mechanism.

Instead of being effected between the two conveyer mechanisms, the steam treatment and the dilution of the juice can be effected upon the first conveyer mechanism, for example by employing paternoster work, the ascending length of which passes through a steam chamber, while the dilution of the juice is carried out on its descending length.

Having now particularly described and ascertained the nature of my said invention and in what manner the same is to be performed, I declare that what I claim is:—

1. Apparatus for extracting juice from sugar cane and similar saccharine material, comprising a chamber divided into a plurality of approximately steam tight compartments, means whereby the bagasse resulting from preliminary pressing operations is conveyed through the chamber, and means for treating the bagasse during its passage first with steam and afterward with highly heated diluting liquid, substantially as and for the purposes specified.

2. Apparatus for extracting juice from sugar cane and similar saccharine material, comprising a chamber divided into two main compartments to which steam and highly heated diluting liquid are respectively supplied, and one or more additional compartments in front of and at the rear of the two main compartments, all the compartments being approximately steam tight and arranged in series, substantially as and for the purposes specified.

3. Apparatus for extracting juice from sugar cane and similar saccharine material, comprising a chamber divided into a series of approximately steam tight compartments by means of suitably spaced partitions and a conveyer band that conducts the bagasse through the chamber, substantially as described.

4. Apparatus for extracting juice from saccharine plants; comprising a chamber, a conveyer-band for bagasse traveling in one direction through said chamber, partitions above and below said band dividing said chamber into primary and secondary compartments, a steam inlet and a hot liquid inlet for said primary and secondary compartments respectively, said compartments being approximately steam tight.

5. Apparatus for extracting juice from saccharine plants; comprising a chamber, a conveyer-band for bagasse traveling in one direction through said chamber, partitions above and below said band dividing said chamber into primary and secondary compartments, a steam inlet and a hot liquid inlet for said primary and secondary compartments respectively, said compartments being approximately steam tight; said partitions being secured on said band so as to partake of its travel.

6. Apparatus for extracting juice from saccharine plants; comprising a chamber, a conveyer-band for bagasse traveling in one direction through said chamber, partitions above and below said band dividing said chamber into primary and secondary compartments, a steam inlet and a hot liquid inlet for said primary and secondary compartments respectively, said compartments being approximately steam tight; said partitions being secured on said band so as to partake of its travel and the partitions on one side of the band being mounted to have a limited oscillatory movement in the direction of travel.

The foregoing specification signed at Berlin this 16th day of August, 1913.

OSCAR MENGELBIER.

In presence of two witnesses:
WOLDEMAR HAUPT,
HARRY L. WILSON.